United States Patent [19]

Bravo

[11] Patent Number: 4,484,597
[45] Date of Patent: Nov. 27, 1984

[54] HOMOGENIZER DEVICE, IN PARTICULAR FOR THE PRODUCTION OF WHIPPED CREAM

[75] Inventor: Francesco Bravo, Montecchio Maggiore, Italy

[73] Assignee: Bravo S.p.A., Italy

[21] Appl. No.: 443,151

[22] Filed: Nov. 19, 1982

[30] Foreign Application Priority Data

Nov. 26, 1981 [IT] Italy .............................. 23634/81[U]

[51] Int. Cl.³ .......................... F16K 21/04; B01F 5/06
[52] U.S. Cl. .............................. 137/512.1; 137/512.5; 137/513; 251/127; 251/DIG. 1; 222/110; 222/190; 222/496; 366/182; 366/336
[58] Field of Search .................. 137/512.1, 512.5, 513; 251/127, DIG. 1; 222/190, 108, 109, 110, 496; 366/182, 336

[56] References Cited

U.S. PATENT DOCUMENTS

| | | | |
|---|---|---|---|
| 3,559,958 | 2/1971 | Carpigiani | 366/336 |
| 3,815,789 | 6/1974 | Carpigiani | 222/190 |
| 3,819,152 | 6/1974 | Clippard | 251/DIG. 1 X |
| 4,000,878 | 1/1977 | Vick | 251/127 |
| 4,044,992 | 8/1977 | Jukoff | 251/127 X |
| 4,354,762 | 10/1982 | Cantoni | 366/336 X |

*Primary Examiner*—Alan Cohan
*Assistant Examiner*—John A. Rivell
*Attorney, Agent, or Firm*—Stevens, Davis, Miller & Mosher

[57] ABSTRACT

A homogenizer device, in particular for the production of whipped cream, comprising in combination, the following components: an external sleeve and an internal sleeve between which is formed a convoluted labyrinth, the internal sleeve housing a valve element which forms with it a chamber communicating with said labyrinth and with the delivery tube for the base mixture, said valve element consisting of a stem bearing a valve at one of its ends and a valve at its opposite end, the former being a valve for controlling the dispensing of the whipped cream and the latter being a valve for controlling the conduction of the mixture through said labyrinth, said valve element being also translatable against a counteracting spring.

3 Claims, 3 Drawing Figures

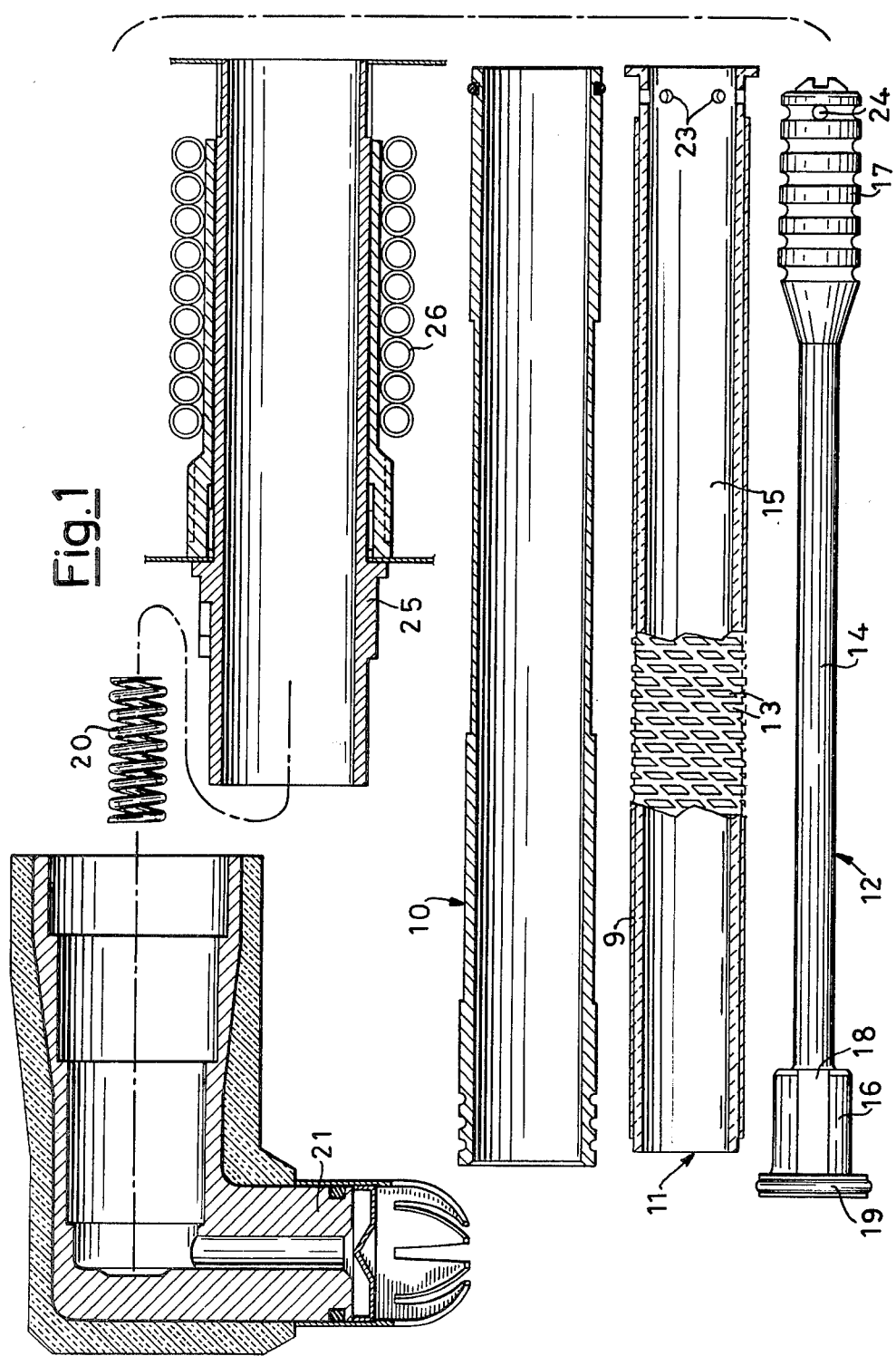

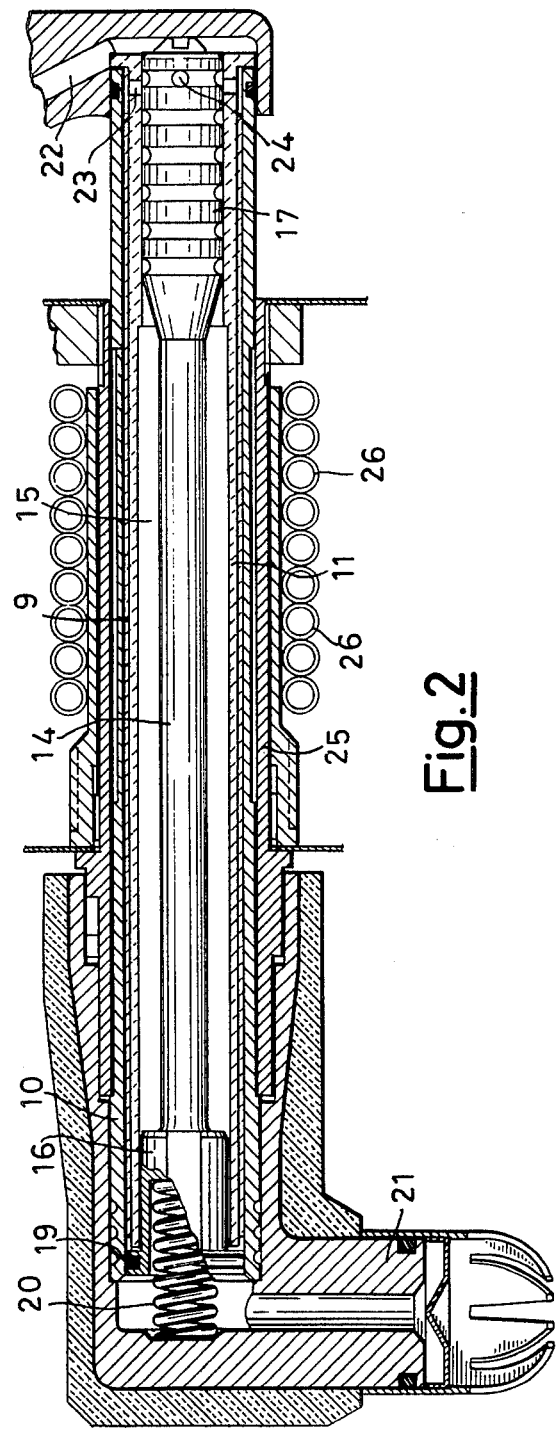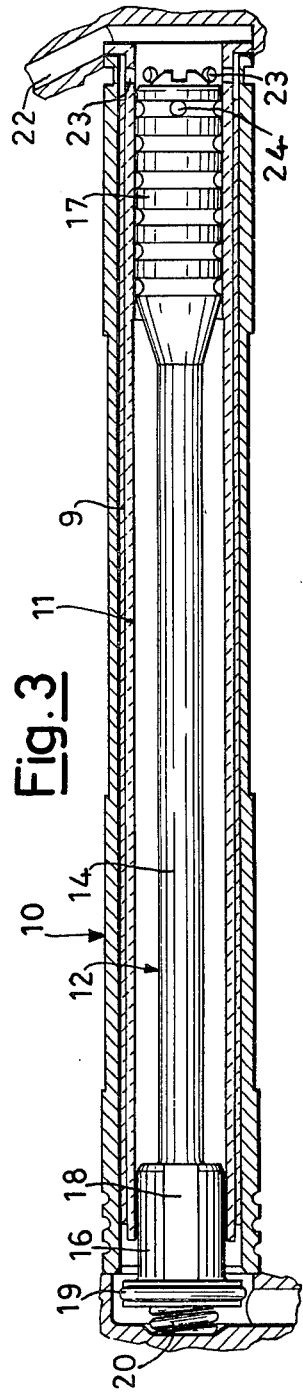

HOMOGENIZER DEVICE, IN PARTICULAR FOR THE PRODUCTION OF WHIPPED CREAM

In whipped cream production, the basic liquid mixture is emulsified with air and then homogenized by forcing it through a narrow and convoluted labyrinth.

Homogenizer devices are known in which said labyrinth is formed on an element which is controlled by the pressure itself of the mixture to be conducted, against a counteracting spring, to a cream dispensing position.

In other words, as well as acting as homogenizer, the said element acts as a valve.

A homogenizer of this type is for example described and illustrated in the U.S. Pat. No. 3,815,789. Such homogenizers suffer from the difficulty that the conducting element is incapable of providing an adequate seal when at rest: for there is always an undesirable escape of a certain quantity of cream.

This is due to the fact that the spring which maintains the said element in the closed position is permanently under pressure from the cream remaining in an upstream position in the labyrinth. This pressure is sufficient to cause losses, inasmuch as the counteracting spring cannot be too powerful as otherwise during operations, an unacceptable cream pressure would be required to move the valve element to a delivery position.

As will be clear, as soon as the spring overcomes the pressure up-stream of the valve element (homogenizer) the escape ceases.

The purpose of the present invention is to obviate the aforesaid difficulty and, to achieve this purpose the invention embodies a homogenizer device, in particular for the production of whipped cream, characterized by the fact that it comprises, in combination, the following components: an external and an internal sleeve between which is formed a convoluted labyrinth, the internal sleeve housing a valve element which with it forms a chamber communicating with said labyrinth and also with the delivery tube for the base mixture, said valve element consisting of a stem bearing a valve at each end.

The first of such valves controls the dispensing of the whipped cream, and the second controls the conduction of the mixture through the labyrinth, this second valve being also translatable against a counteracting spring.

The structural and functional characteristics of the invention and its advantages over the known art will be more clearly evidenced by the following exemplification description referred to the attached drawings, in which:

FIG. 1 is an exploded view in longitudinal section of the component parts of a homogenizer according to the invention, FIG. 2 is a longitudinal section of the assembled homogenizer at rest, and FIG. 3 is a partial section analogous to FIG. 2, but showing the homogenizer in operating conditions.

With reference to the drawings, the homogenizer in question, also known as texturizer, consists of three fundamental parts: an external sleeve 10, an internal sleeve 11 and a valve element 12 (FIG. 1).

As FIGS. 2 and 3 of the drawings clearly show, the sleeve 10 receives the sleeve 11 coaxially, the valve element 12 being fitted into the latter.

The outer surface of the sleeve 11 is shaped so as to feature a plurality of teeth 13, for example trapezoidal in form, which, with the inner surface of the sleeve 10, form a convoluted labyrinth 9 in which the base mixture is homogenized after emulsification with air.

The valve element 12 comprises a stem 14 which, with the sleeve 11, forms a chamber 15 (FIGS. 2 and 3) acting as a pressure equalizer, in the manner explained hereinafter. The said stem 14 bears a first valve head 16 at one end and a second valve head 17 at the opposite end.

The valve head 16 is hollow and faced as shown at 18 and terminates in an annular gasket 19 adapted to seal the end of the sleeve 10 where the labyrinth debouches, followed by the cream under pressure. A spring 20 which acts between the valve head 16 and the body of a conventional dispensing spout 21, maintains the valve element 12 in the closed position according to FIG. 2.

The valve head 17 controls the communication between the delivery tube 22 of the pump (not shown) and the aforesaid labyrinth. This communication is by means of a set of radial holes 23 in the sleeve 11, which are uncovered by the shifting of the valve element 12 to the position of FIG. 3.

In the valve head 17 there is also a passage 24 which, when the machine is idle, ensures communication between the delivery tube 22, the labyrinth and a portion of the chamber 15.

The communication between the labyrinth and the chamber 15 when the valve head 16 is unseated is assured by the facings 18 on the valve head 16.

As FIG. 2 clearly shows, the homogenizer unit formed by the particulars 10, 11 and 12 is assembled to the body of the machine through an external tube 25 comprising the coil 26 of the cooling circuit.

The functioning of the machine described above is evident from the preceding description with reference to the drawings and is, briefly, as follows:

The whipped cream is duly prepared and delivered by operating the pump (not shown) which takes off the base mixture and, after emulsification of this with air, sends it to the homogenizer through the delivery tube 22.

The pressure of the mixture shifts the valve element 14 into the position of FIG. 3, with the result that the mixture can pass through the labyrinth 9 to be homogenized and dispensed through the spout 21.

When the pump is switched off the upstream pressure drops, so that the spring 20 closes the valve element, the said upstream pressure cancelling itself out as a result of the transfer of the cream from the labyrinth 9 to the pressure equalizing chamber 15. The valve element is thus no longer under pressure and the purpose of obviating undesirable escape of cream when the machine is idle is achieved.

I claim:

1. A homogenizer device, in particular for the production of whipped cream, comprising, in combination, a delivery tube, an external sleeve, an internal sleeve having teeth on the outside thereof to form a convoluted labyrinth with said external sleeve, a valve element housed by said internal sleeve which forms with it a chamber communicating with said labyrinth and with the delivery tube for the base mixture, said valve element consisting of a stem bearing a first valve head at one of its ends and a second valve head at its opposite end, said first valve head being a valve for controlling the dispensing of the whipped cream and the second valve head being a valve for controlling the conduction of the mixture through said labyrinth, and a spring, said valve element being also translatable against said spring.

2. A device according to claim 1, including an annular gasket on said first valve head, said first valve head with said annular gasket sealing the external sleeve and including facings which place said labyrinth into communication with said chamber.

3. A device according to claim 1, wherein said internal sleeve defines radial holes which communicate said labyrinth with the delivery tube.

* * * * *